United States Patent
Chatillon et al.

(10) Patent No.: US 12,453,530 B2
(45) Date of Patent: Oct. 28, 2025

(54) METHOD FOR CHARACTERIZING A TUBULAR OBJECT SUCH AS A BLOOD VESSEL BY ULTRASONIC IMAGING

(71) Applicant: COMMISSARIAT A L'ENERGIE ATOMIQUE ET AUX ENERGIES ALTERNATIVES, Paris (FR)

(72) Inventors: Sylvain Chatillon, Gif-sur-Yvette (FR); Djallel Belhadj, Gif-sur-Yvette (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/977,499

(22) Filed: Dec. 11, 2024

(65) Prior Publication Data

US 2025/0195031 A1 Jun. 19, 2025

(30) Foreign Application Priority Data

Dec. 18, 2023 (FR) ...................................... 2314398

(51) Int. Cl.
*A61B 8/08* (2006.01)
*A61B 8/00* (2006.01)

(52) U.S. Cl.
CPC ............ *A61B 8/0891* (2013.01); *A61B 8/085* (2013.01); *A61B 8/5215* (2013.01)

(58) Field of Classification Search
None
See application file for complete search history.

(56) References Cited

U.S. PATENT DOCUMENTS

2021/0100523 A1* 4/2021 Jiang ...................... A61B 8/488

FOREIGN PATENT DOCUMENTS

| JP | 5854072 B2 | 2/2016 |
| WO | 2016/057233 A1 | 4/2016 |

OTHER PUBLICATIONS

Fleagle, et al., "Automated analysis of coronary arterial morphology in cineangiograms: geometric and physiologic validation in humans", IEEE Transactions on Medical Imaging, vol. 8, Issue: 4, pp. 387-400, Dec. 1989.

Hennersperger, et al., "Multi-Scale Tubular Structure Detection in Ultrasound Imaging", IEEE Transactions on Medical Imaging, vol. 34, Issue: 1, pp. 13-26, Jan. 2015.

(Continued)

*Primary Examiner* — Jonathan Cwern
(74) *Attorney, Agent, or Firm* — BakerHostetler

(57) ABSTRACT

A method for characterizing a tubular object by ultrasonic imaging includes: acquiring a plurality of ultrasonic signals originating from the reflection of an ultrasonic field transmitted by the transducer in a region of interest in a transverse cross-sectional plane of the object, for different positions of the transducer relative to the region, all of the ultrasonic signals forming an ultrasonic image of the region; for each signal corresponding to a vector of the image, applying a predetermined first filter to the signal; selecting, from all of the signals, the signal for which the result of the filter contains the extremum with the highest absolute value, and plotting the abscissa of this extremum; and determining the centre of the object from the abscissa plotted and the velocity of the ultrasonic signal.

11 Claims, 6 Drawing Sheets

(56) References Cited

OTHER PUBLICATIONS

English translation of the Preliminary Search Report and Written Opinion on Patentability of the Invention issued in French Patent Application No. 2314398 dated Aug. 8, 2024.
Gagan, et al., "Automated Segmentation of Common Carotid Artery in Ultrasound Images", in IEEE Access, vol. 10, pp. 58419-58430, 2022.
Savoia, et al., "A feasibility study of a PMUT-based wearable sensor for the automatic monitoring of carotid artery parameters", 2021 IEEE International Ultrasonics Symposium (IUS), 2021.

* cited by examiner

METHOD FOR CHARACTERIZING A TUBULAR OBJECT SUCH AS A BLOOD VESSEL BY ULTRASONIC IMAGING

CROSS-REFERENCE TO RELATED APPLICATION

This application claims priority to foreign French patent application No. FR 2314398, filed on Dec. 18, 2023, the disclosure of which is incorporated by reference in its entirety.

FIELD OF THE INVENTION

The invention relates to the field of ultrasonic imaging, particularly medical imaging, and more specifically pertains to a method making it possible to determine the centre and diameter of a tubular object such as a blood vessel.

Ultrasonic imaging, particularly in the medical field, aims to image different types of objects or organs of the human body in order to improve the characterization thereof.

BACKGROUND

In the field of medical imaging, there is a need to characterize blood vessels, particularly arteries. The arteries are a true health indicator, as they provide essential information about the state of health of the human body. Real-time monitoring of the arteries makes it possible to track biological markers such as arterial pressure in order to better understand how the human body works and anticipate the development of diseases. The development of ultrasound technologies makes it possible to design compact imaging systems that offer a non-invasive solution. Real-time monitoring requires that the entire measuring chain, from acquisition and location of the artery to the extraction of relevant information, must be fully automated.

In this general field, there is a particular need to characterize the arteries by means of detecting their centre and measuring their diameter.

The ultrasonic imaging methods that propose solutions for characterizing blood vessels are usually focused on the longitudinal dimension of the vessel, for example the carotid artery.

These methods are varied, but they can be grouped into three non-exhaustive categories that comprise manual, semi-automatic and automatic methods.

The manual methods are based on human expertise for manually determining the position of arteries, for example using graphical tools applied to ultrasonograms.

In the case of semi-automatic methods, assistive algorithms work in conjunction with a human. For example, the algorithm can continue to locate the artery automatically using the human as a guide, who confirms, corrects and provides reference information that helps the algorithm to find the correct location.

In the category of fully automatic methods, the algorithm automatically determines the artery location. Most of these automatic methods relate specifically to the problem of locating the carotid artery and do not work optimally with other arteries. The case of the carotid artery is less restrictive than other arteries, such as the radial artery, for several reasons. The carotid artery is larger with thicker walls and has a different intensity profile from the radial artery, with less noise and more contrast. Because the carotid artery has a larger diameter than the radial artery, ultrasonograms have better contrast. It is thus easier to identify the centre of the carotid artery just by looking for the region with the lowest intensity profile. In comparison with the radial artery, ultrasonograms of the carotid naturally contain fewer anatomical objects that can be confused with the artery. The larger size of the carotid artery also contributes, as it makes it possible to limit the fields of the ultrasonic images, which makes it possible to obtain images that contain the fewest noisy objects. Most of the methods developed for the carotid artery focus on the longitudinal dimension, which makes it possible to further facilitate locating the artery simply by identifying the horizontal trace with the lowest intensity profile. The other anatomical objects have a less noisy footprint in this dimension. Most of the algorithms vertically locate the region with the lowest intensity, by scanning the whole image; after this, the artery is located according to a consensus of the points identified after the removal of the outliers. These methods based on the longitudinal dimension are sensitive to the orientation of the probe and all require work to position the probe accurately on the skin during acquisition. Orientation uncertainty makes the measurement of the diameter and other properties inaccurate. It is possible to get around this problem by using multidimensional probes, but these are more costly.

Although the transverse dimension is more difficult to process, as the shape of the anatomical objects in this dimension is seen from the front and interferes with location, in particular in the case of the radial artery, the advantage of the transverse dimension is that it does not require accurate positioning of the probe on the skin, and the diameter measurements are robust and reliable with respect to errors in the orientation of the probe.

The existing solutions for automatic location in the transverse dimension of the arteries, or more generally blood vessels, are rare and all suffer from one or more limitations. The methods based on deep learning are effective but consume a lot of energy, are unsuitable for small portable systems, are complex to implement and require huge amounts of resources. It is difficult to achieve real-time performance in particular on a portable computer. These methods are incorporated into assistance interfaces for which the requirements are not limited in time and resources. Likewise, neural networks characterized by their black box aspect suffer from the problem of unpredictability. It has been demonstrated that a single pixel of an image can cause a neural network to provide aberrant data. This problem is moreover the main cause slowing down the adoption of artificial intelligence in the medical field, and fields with serious consequences.

Doppler-based solutions allow location through the frequency change linked to blood flow. These methods are limited to vertical location, where the depth of the artery is identified. Horizontal location is performed manually. Another drawback of these methods is that Doppler location requires the monitoring of the ultrasonic frequencies over time, which means that all of these methods need the time dimension in order to locate the artery.

Other limitations can be seen in several aspects such as the speed of execution and the satisfaction of real time standards for example. Iterative search algorithms for example are slow and require considerable resources to achieve real-time operation.

Algorithms that require a reference model and prior information are a hindrance. Another aspect is linked to algorithms that are noise-sensitive and require preprocessing in order to condition the data received before the location method is executed. Some existing solutions are based on reference points such as contours, which makes them vulnerable to imperfections in the data. These methods often use preprocessing, consensus and outlier removal algorithms in order to ensure robustness, which adds complexity and calculations.

Other methods are applied to other technological solutions outside the scope of ultrasounds such as so-called intravascular ultrasound (IVUS) methods and so-called optical coherence tomography (OCT) methods. Although these methods relate to images of arteries, they do not relate to the same problem, as the profile of the data processed is different in terms of intensity, noise and difficulties. These methods also inherit the drawbacks of these technologies such as invasiveness in the case of IVUS methods and depth limitation in the case of non-invasive OCT methods.

Patent application WO2016057233 discloses a method for estimating a continuous arterial pressure waveform non-invasively using ultrasound and an automated cuff. It pertains to the category of continuous non-invasive arterial pressure measurements. The proposed system measures physical properties such as the geometry, elasticity and deformation of a blood vessel, together with other external physical parameters. Computer modelling and the processing of the signals measured are used during the inflation and/or deflation of the cuff in order to iteratively estimate the arterial pressure of the subject. The ultrasonic part makes it possible to estimate the diameter of the artery and calculate the elasticity thereof.

The location of the artery in this solution is limited by several points: firstly, the transducer arrays are attached by a trained operator in an approximate location and the artery is located in three dimensions by a method of iteratively searching for assumed geometric and ultrasonic response characteristics. The search is not only iterative, which consumes a great deal of calculation power, but is carried out in a 3D search space, and therefore on a large quantity of data. This limits the speed of execution, in particular for devices with limited resources and energy consumption. In addition, this search in the 3D space is carried out by comparing each iteration with a reference artery model built using prior information personal to the subject, such as their age, size, etc. As well as requiring a reference model and prior information, this solution also requires a two-dimensional probe to allow acquisition in the 3D space on which the iterative search algorithm is run. With slow location, the refreshing of the position of the artery creates a compromise with respect to speed, precision and the movement of the person.

Document [1] discloses a method intended to characterize the carotid artery that can be applied to the longitudinal and transverse dimensions of said artery. It consists of a contour detection algorithm based on the "snake" method and provided with a mathematical artery reference model in the form of B-splines that deforms in terms of scaling, translation and rotation. The method converges towards the carotid artery contours by means of an optimization algorithm. The convergence criterion is provided by the sum of the absolute differences between the model and the image at each point of the image. The parameters of the model are optimized iteratively by means of an energy minimizing algorithm, and the sum of the absolute differences is then calculated at each point. A circular shape of the reference model is used to simplify calculation. A gradient-based optimization algorithm is applied to refine accurate segmentation of the artery contours detected.

In this document, the shape of the carotid artery is quite large and circular, and the thickness of its wall is quite large, which makes it easy to distinguish the contours of the layers on which the algorithm is based. This solution is not applicable to other types of artery, such as the radial artery, for several reasons. Firstly, the radial artery often appears with a shape that is neither perfectly circular nor perfectly rectangular, as it is small in size. The wall of the radial artery is thin, which means that its layers cannot be distinguished with standard probes with a low central frequency; this requires high-quality probes with higher ultrasonic frequencies. For this reason, and given that the method of document [1] is based on local contrast differences between the inner and outer contours, it will be difficult for the algorithm to accurately locate the region of interest in cases where the artery or the surrounding tissue lacks texture or contrast, which is the case for the radial artery.

The anatomical objects on the transverse images of the carotid such as the jugular vein also have shapes that are non-circular and easy to distinguish relative to the carotid artery. For this reason, there is no risk that the algorithm will converge towards other objects. In the case of the radial artery, several anatomical objects have a shape and position that greatly resemble the radial artery, which means that there is a risk that the method will converge towards the other objects instead of the radial artery, as the criterion of the sum of the absolute differences will also be satisfied for example by the neighbouring veins of the artery.

The method requires image-improving preprocessing based on adaptive histograms in order to reduce noise. This is because there is a risk that noise will considerably increase the convergence time necessary for the optimization algorithms on which the method is based. The convergence time is variable and depends on the intensity profiles of the image acquired, its complexity, the position of the artery and its resemblance to the model. It also depends on the initialization parameters incorporated into the model. If the image contains complex anatomical structures or if the artery itself has irregular shapes, the approach of comparison with the reference model might not work correctly within the time allowed.

In addition, the model might not be sufficiently flexible to manage these variations, which leads to misalignment. As a result, this method is more suitable for applications that do not require strict real-time constraints, and a regular time-of-flight measurement at fixed intervals. The method compares the pixels of the image with a model at each point of the image, while calculating each time the sum of the absolute differences criterion on the pixels. This operation is calculation-intensive, which requires that the method uses optimization algorithms to reduce the calculation time. The drawback of this technique is that it makes the solution entirely dependent on the convergence time of the optimization algorithm, which is an iterative algorithm that depends on the complexity of the image and is vulnerable to convergence problems such as the local minima. In addition, the optimization can converge towards the veins rather than the artery on transverse scans of the radial artery.

The method disclosed in document [2] relates to the location of the carotid artery in transverse images. The method is based on the Hough circle transform, a method that makes it possible to detect lines in the image and has been adapted to detect circles. The method processes sequences of 5 to 15 consecutive images. Each image is preprocessed to optimize brightness and contrast. A powerful Gaussian filter then reduces noise. Although several fine morphological structures have been destroyed in this process, the carotid artery appears clearer. The Hough transform then detects all of the dark circles, taking into consideration all of the radii that are situated in a reasonable range. The coordinates of the centres detected (xi, yi) and the radii (ri) are collected. For each of the dark circles detected, the brightness values of their pixels are evaluated. The circle that has the darkest values, that is, the minimum brightness, is elected as a "candidate circle", and its centre coordinates (xci, yci) with a radius (rci) are recorded in a matrix of potential candidates. Once all of the B-mode images have been processed, the matrix contains the results obtained from each image. The triplet (xc, yc, rc) that occurs most frequently in the matrix is selected as the final choice.

This third method is not suitable for the radial artery either, for the following reasons. The carotid artery has a fairly circular shape, and is distinguished as a fairly dark region that is easy to discern relative to the other anatomical objects. The shape of the radial artery on ultrasonic images does not appear as perfectly circular. In addition, there are several anatomical objects similar to the artery, for example the neighbouring veins, which are sometimes darker than the radial artery and also have a circular shape. The Hough transform can be adapted to other more complex shapes in order to apply it to the radial artery; however, this considerably increases the intensity of the calculations, as the circular shape as disclosed in document [2] already requires the performance of a search in a 3D space, which requires much more intensive calculation than with the standard Hough transform. For each circle diameter, the method performs the calculation of a new accumulator on the whole image. The radial artery can deform easily, for example towards an elliptical shape, which involves an additional parameter to be taken into consideration by the Hough transform. The shape of the radial artery is much more deformed than the shape of the carotid artery, as the size is smaller, which means that the contours are smaller and therefore more deformed by the noise observed on the ultrasonic images. The Hough transform provides multiple detections and selection according to the darkest region will not work in the case of the radial artery, as the neighbouring veins can be darker. These multiple detections cause a large number of false detections, which requires either the use of more complex criteria or the consideration of the time dimension in order to improve the location robustness. For this reason, the method requires five successive images. The Hough circle transform requires a step of detecting contours and thresholding adjustments. The detection of contours is vulnerable to noise in the image, which implies the need for noise-improving and noise-filtering preprocessing. For this reason, the method in that document states that powerful Gaussian filtering is necessary.

All of the aforementioned methods have the drawbacks described. There is therefore a need for a new method that is applicable to the characterization of the transverse cross-section of an artery, particularly the radial artery, that does not require a two-dimensional probe and is suitable for the acquisition environment of the artery to be characterized, in particular the noise and the presence of other biological objects.

SUMMARY OF THE INVENTION

The invention makes it possible to locate and automatically characterize a radial artery in its transverse cross-section. It involves a first phase of locating the centre of the artery from several ultrasonic acquisitions forming a 2D image of the transverse cross-section comprising the cross-section of the artery, and then a second phase of determining the diameter of the artery from the ultrasonic measurement corresponding to the path passing through the centre of the artery.

The invention does not require accurate positioning of the probe on the skin by an expert, and tolerates angular positioning uncertainties. This makes it possible to obtain reliable measurements even in the presence of movement of the subject and of the probe relative to the subject. The diameter is measured at the horizontal point most relevant to the centre of the artery, which is the point that provides the most accurate measurement of the diameter.

The principle of the invention is based on a convolution filter approach and comprises a base filter specially dedicated to detecting an artery or more generally a tubular object. Once the centre of the artery has been located, methods for extracting the properties of the artery are applied locally to the result of the filter.

The proposed method has low complexity and can be implemented with ease, as almost all of the location operations are carried out in the form of single operations, which constitutes a considerable advantage of simplicity and makes it possible for the method to be embedded in portable systems with limited resources and for time-of-flight measurements to be taken. The proposed method does not require any comparison with a reference model, or the calculation of a resemblance criterion at each point, or any intensive iterative calculations, or involve any risk of the iterative convergence or local problems suffered by optimization algorithms. Another advantage of the invention is that it can be implemented in synchronization with acquisition incrementally as the signals are received, without needing to wait for the end of acquisition. This allows rapid refreshing of the location of the artery. Unlike the existing methods, the proposed method does not need to store a large number of parameters, as it gradually updates the summation and the coordinates of the extremum point as the calculation evolves. Some existing solutions are based on reference points such as contours, which makes them vulnerable. Some of these solutions use methods for improving the noise or removing outliers, which increases the complexity and the calculations. The proposed solution is based on the overall information, which makes it robust with respect to noise and does not require image-improving preprocessing or outlier removal algorithms.

The proposed solution performs the location directly in the space dimension of a single transverse acquisition and does not need multiple acquisitions in the time dimension, unlike Doppler-based methods in particular. The proposed method does not need prior information about the person, or an artery reference model. With rapid location, the position of the artery is refreshed at high speed and offers at the same time the possibility of a higher measurement frequency, greater accuracy and more freedom of movement for the person.

Although the invention is described in the particular context of characterizing a blood vessel for medical imaging applications, it can also be applied to the field of non-destructive ultrasonic testing for characterizing any type of tubular object.

The invention relates to a method for characterizing a tubular object by ultrasonic imaging, the method comprising the steps of:

Acquiring, by means of an ultrasonic transducer, a plurality of ultrasonic signals originating from the reflection of an ultrasonic field transmitted by the transducer on a region of interest in a transverse cross-sectional plane of the object, for different positions of the transducer relative to said region, all of the ultrasonic signals forming an ultrasonic image of the region, Selecting a dimension of the ultrasonic image and, for each signal corresponding to a vector of the image along the dimension selected, applying a predetermined first filter to the signal, the filter being configured so as to convert a first signal comprising two extrema of the same sign into a second signal comprising one extremum of opposite sign situated between the two extrema of the first signal, Selecting, from all of the signals, the signal for which the result of the filter contains the extremum with the highest absolute value, and plotting the abscissa of this extremum, Determining the centre of the object from the abscissa plotted and the velocity of the ultrasonic signal.

According to one particular aspect of the invention, the filter is applied to the envelope of the ultrasonic signal or to the absolute value of the ultrasonic signal.

According to one particular aspect of the invention, the filter is applied to the signal in a sliding window of predefined size as a function of the size of the signal and/or prior information about the dimension of the object, the filter being defined on at least three consecutive time intervals by three respective functions each weighted by a factor, the factors associated with two consecutive time intervals being of opposite signs.

According to one particular aspect of the invention, the dimension of the second time interval is selected so that it is strictly less than the minimum diameter of the object to be characterized.

According to one particular aspect of the invention, the filter is defined on at least two additional time intervals.

According to one particular aspect of the invention, each of the functions is taken from: a sum, a maximum value, a mean, or a combination of these functions.

In one variant embodiment, the method according to the invention further comprises the steps of:

Selecting the ultrasonic signal acquired for which the centre of the object has been determined, Applying a predetermined threshold to said ultrasonic signal selected, Detecting at least two extrema of said signal that are greater than the threshold, Selecting the pair of extrema, comprising a first extremum and a second extremum, closest to the centre of the object and situated on either side of the centre of the object, plotting their respective time abscissas and deducing therefrom the inner diameter of the object on the basis of the difference between the two abscissas and the velocity of the ultrasonic signal.

In one variant embodiment, the method according to the invention comprises the steps of:

Selecting a third extremum greater than the threshold and situated immediately before the first extremum, Selecting a fourth extremum greater than the threshold and situated immediately after the second extremum, Plotting the time abscissas of the third extremum and the fourth extremum and deducing therefrom the outer diameter of the object on the basis of the difference between the two abscissas and the velocity of the ultrasonic signal.

According to one particular aspect of the invention, the object is a blood vessel, for example an artery.

According to one particular aspect of the invention, the step of acquiring a plurality of ultrasonic signals comprises the sub-steps of:

Positioning a transducer comprising a plurality of aligned elements on an area of the skin so as to image a transverse cross-section of the blood vessel, Performing a plurality of successive ultrasonic acquisitions from different transmission points situated on the axis of alignment of the elements, each ultrasonic transmission being performed in a direction substantially perpendicular to the axis of alignment.

The invention also relates to an ultrasonic imaging device comprising an ultrasonic transducer and a processing unit configured to perform the steps of the method according to the invention.

BRIEF DESCRIPTION OF THE DRAWINGS

Further features and advantages of the present invention will become more clearly apparent on reading the following description with reference to the following appended drawings.

DETAILED DESCRIPTION

Figure 2:
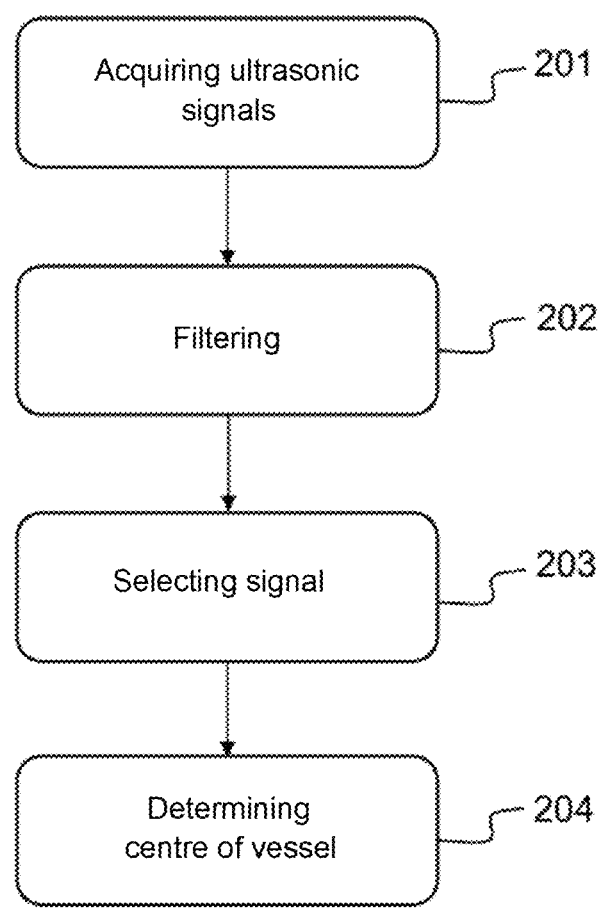
FIG. 2 shows a flow chart describing the steps of implementing a method for detecting the centre of a blood vessel according to one embodiment of the invention.

FIG. 2 shows, on a flow chart, the main steps of implementing a method for determining the centre of a blood vessel, for example a radial artery, according to one embodiment of the invention.

The method starts at step 201 with the acquisition of ultrasonic signals in a transverse plane of the artery or vessel.

Figure 1:
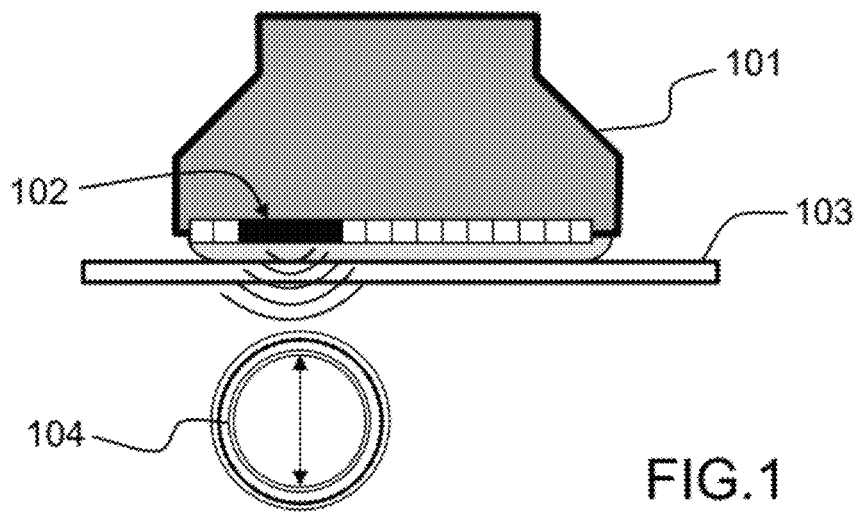
FIG. 1 shows a diagram of an ultrasonic multi-element probe suitable for performing a sequence for acquiring ultrasonic signals for imaging a blood vessel.

This acquisition is performed by means of a probe shown in FIG. 1.

The acquisition probe is advantageously a multi-element linear probe 101, that is, comprising a plurality of ultrasonic elements 102, for example piezoelectric elements, aligned in a row. Alternatively, a two-dimensional probe, that is, comprising an array of ultrasonic elements, can also be used.

In the example in FIG. 1, the probe 101 is positioned in contact with the skin 103 so that the row of elements 102 is substantially in a transverse plane of an artery 104 to be imaged. The probe 101 is not necessarily centred on the artery 104; the artery must simply be covered by the transmitting and receiving of the ultrasonic beam generated by the probe so as to obtain a transverse footprint of the artery.

The acquisition 101 is performed by means of successive scanning during which, in each step, an ultrasonic beam is transmitted by a group of elements 102 comprising at least one element, in a direction perpendicular to the axis of alignment of the elements. The same elements act as receivers in order to generate an ultrasonic signal corresponding to a predefined acquisition period and an axis substantially perpendicular to the group of elements 102.

This step makes it possible to acquire an ultrasonic signal. It is then iterated by shifting the active ultrasonic elements by one element, in a sliding window, and then performing a new acquisition. By performing a plurality of successive acquisitions by means of a group of elements of fixed size that scans all of the elements of the probe, a plurality of ultrasonic signals are thus obtained that together form an ultrasonic image of a transverse plane of the artery 104.

This acquisition makes it possible to obtain, in two dimensions, a transverse ultrasonic footprint of the target radial artery together with any other anatomical objects present around it, such as veins.

Without departing from the scope of the invention, other ultrasonic acquisition methods can be envisaged provided that they make it possible to obtain a 2D image of said transverse plane. On the image obtained, which corresponds to a signal sample matrix, the vertical position represents the depth, that is, the distance between the probe and an anatomical element situated under the probe. The horizontal position represents a point on the skin 103 corresponding to the transmission point of the ultrasonic beam.

Figure 3A:
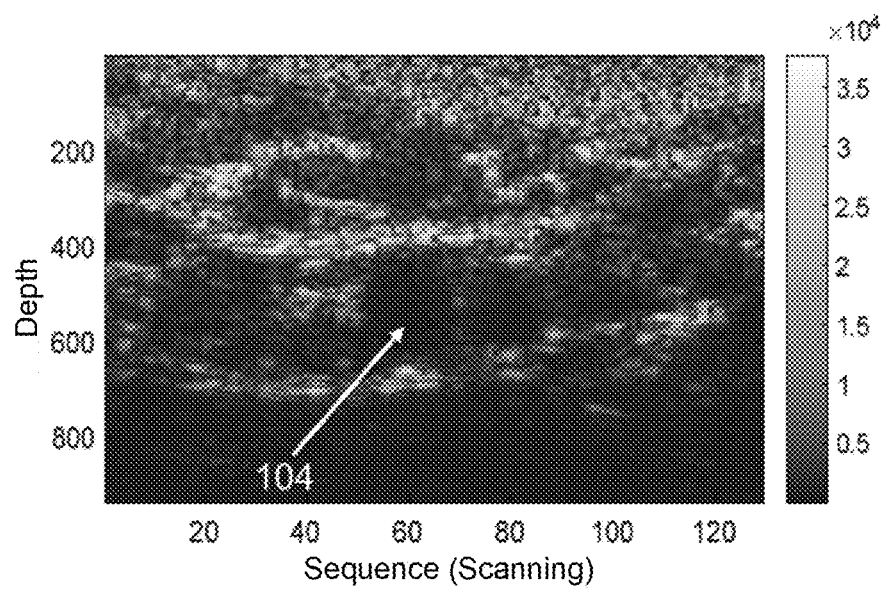
FIG. 3a shows an ultrasonic image of a region of a transverse plane comprising a radial artery.

FIG. 3a shows an example of an ultrasonic image obtained with identification of the radial artery 104. It can be seen that in this image, the footprint of the artery 104 is difficult to detect as it is drowned in the noise and polluted by the footprints of other anatomical objects.

One aim of the invention is to identify the point on the skin situated in line with the centre of the artery in order to determine the ultrasonic measurement that corresponds to a path passing through this centre.

Figure 4A:
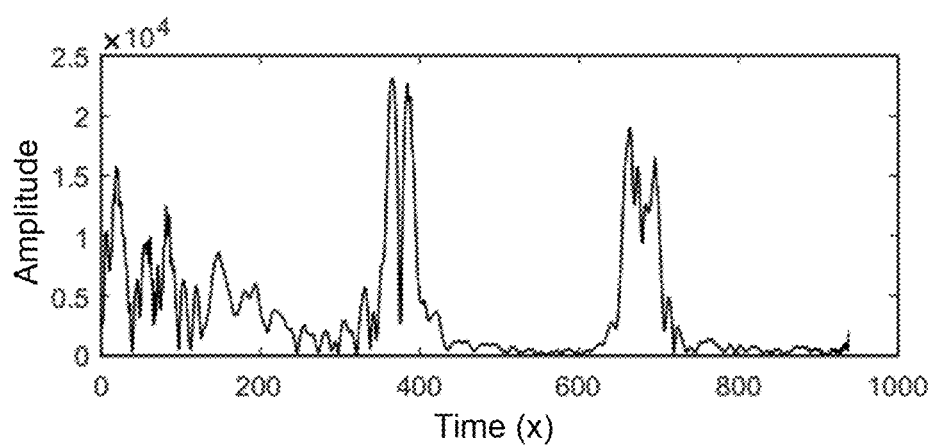
FIG. 4a shows a time diagram of an ultrasonic signal acquired by means of the probe in FIG. 1.

FIG. 4a shows an example of an ultrasonic signal acquired during a single acquisition. The signal in FIG. 4a corresponds to a column of the matrix in FIG. 3a. Each column of this matrix corresponds to an acquisition from one point of the surface of the skin. More specifically, the signal in FIG. 4a corresponds to the envelope or the absolute value of the ultrasonic signal acquired.

In step 202, one or more filtering steps specifically suitable for identifying the centre of the artery are then applied for each of the signals acquired (each column of the 2D matrix).

As can be seen in FIG. 4a, an acquisition in the transverse plane of the artery is characterized by two amplitude peaks or groups of amplitude peaks that correspond to the echoes on the walls of the artery. Between these two peaks is the inside of the artery.

A first filter is applied to the signal in FIG. 4a. This filter is defined so as to convert the signal in FIG. 4a, which comprises two extrema of the same sign, into another signal that comprises an extremum of opposite sign situated substantially half-way between the two extrema of the first signal.

Figure 4B:
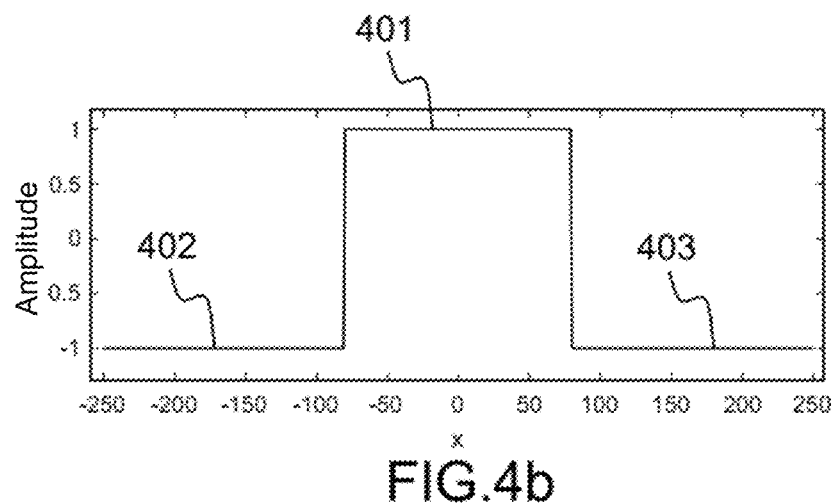
FIG. 4b shows an example of a filter intended to be applied to the signal in FIG. 4a, FIG. 4c shows the result of the application of the filter in FIG. 4b to the signal in FIG. 4a, FIG. 4d shows the result of an additional filtering step applied to the signal in FIG. 4c.

An example of a filter is shown in FIG. 4b. This filter corresponds to a time slot. It has a total size greater than the diameter of the artery to be detected and is made up of three successive parts. The central part 401 is fixed at a positive value, for example equal to 1, over a period corresponding to a distance less than the inner diameter of the artery.

The other two parts 402, 403 are fixed at a negative value, for example equal to −1.

More generally, it is possible to replace the value 1 by another positive value and the value −1 by another negative value.

When applying a convolution of this filter with the signal acquired, the outer parts of the filter 402, 403 contribute negatively to the convolution results, while the central part 401 contributes positively to the convolution results.

When this filter is applied to the signal acquired in the region corresponding to the artery, the amplitude peaks corresponding to the walls of the artery will be aligned with the outer regions of the filter 402, 403, and their contribution will therefore be negatively summed. Conversely, when the central part of the filter does not coincide with the central region between the two amplitude peaks but coincides with one of the amplitude peaks, the result of the convolution with the filter will be a positive value.

Figure 4C:
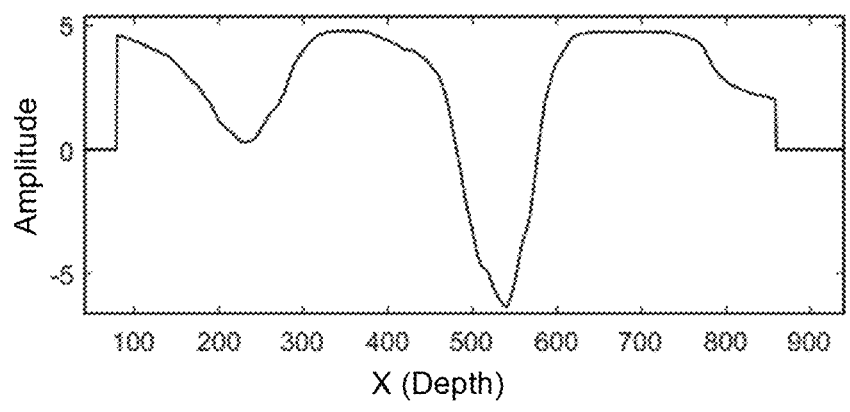

FIG. 4c shows the result of applying the filter in FIG. 4b to the signal in FIG. 4a. It can be seen that the filtered signal obtained has positive amplitudes everywhere apart from in the region corresponding to the inside of the artery.

Figure 4D:
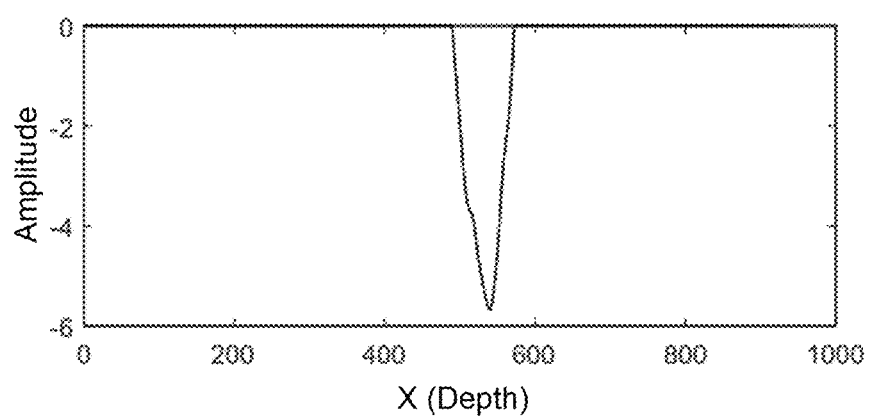

FIG. 4d shows the final result obtained by zeroing all of the positive values. The extremum of the signal in FIG. 4d corresponds to a point of the region inside the artery for which there are only negative contributions, that is, a situation in which the central region 401 of the filter is applied between the two amplitude peaks corresponding to the walls of the artery.

By analyzing the filtered signals of the type in FIG. 4d for all of the acquisitions, it is thus possible to identify the centre of the artery.

The filter described in FIG. 4b is a non-limiting example and can be adapted to the situation to be analyzed. In particular, the dimensions of the three parts 401, 402, 403 of the filter can be adapted according to the maximum dimensions of the blood vessels to be detected.

In particular, the dimension of the central part 402 can be selected to be strictly less than the minimum diameter of a vessel to be characterized. Alternatively, this dimension can be selected so that it is of the order of the mean diameter of the vessels to be characterized. The selection of the dimensioning also depends on the type of base function applied by the filter (maximum, minimum, mean or sum in particular).

Other filter variants can be envisaged, as described herein.

If the envelope or absolute value of the ultrasonic signal acquired is denoted S, this signal being made up of $N_x$ samples:

$S=\{i(x)|1 \leq x \leq N_x\}$, where $i(x)$ is the ultrasonic intensity (amplitude) at point x of the signal S.

It will be noted that $ROI_r=\{i(a_r), i(a_r+1), i(a_r+2) \ldots, i(b_r), |a_r \leq x \leq b_r; (a_r, b_r) \in S\}$, where $ROI_r$ is a region of interest r represented by all of the points of the signal S situated in the interval $[a_r, b_r]$. The filter is defined by the application of functions with a plurality of regions of interest. In the example in FIG. 4b the number of regions of interest is equal to three, but it can be greater than three as described hereinafter.

The general form of the filter applied to the signal is given by:

$F = \sum_{r=1}^{N_r} \alpha_r f^r(ROI_r)$, where $f^r$ is a function with strictly positive values applied to the signal, such as for example the maximum, the sum or the mean on all of the points belonging to the region $ROI_r$. $\alpha_r$ is a predefined weighting factor. In the example in FIG. 4b, there are three regions of interest, therefore $N_r=3$ and the functions $f^r$ are all the sum function with factors equal to −1 for the outer regions of interest and +1 for the central region of interest of the filter.

More generally, the factors can have an absolute value other than 1, and the filter F is then written:

$$F = \alpha_1 f^1(ROI_{ProximalWall}) + \alpha_2 f^2(ROI_{DistalWall}) - \alpha_3 f^3(ROI_{Trough})$$

The region of interest $ROI_{trough}$ corresponds to the central region of the filter and the regions of interest $ROI_{ProximalWall}$ and $ROI_{DistalWall}$ correspond to the outer regions of the filter.

For the example in FIG. 4b, the filter can be expressed as:

$$F = \text{sum}(ROI_{Trough}) - \text{sum}(ROI_{ProximalWall}) - \text{sum}(ROI_{DistalWall})$$

Other forms of filter can be considered, either calculated directly or calculated locally on the points detected by a first filtering step.

In particular, filters made up of five regions of interest can be considered in order to take into account the outer and inner walls of a vessel. The outer wall and the inner wall are separated by a non-echogenic middle layer. The signal acquired can therefore have, for each of the proximal and distal walls, two amplitude peaks separated by a region close to zero, wherein the two peaks correspond to the outer and inner walls.

$$F = +\alpha_1 f^1(ROI_{ProximalWall}) - \alpha_4 f^4(ROI_{ProximalMiddleLayer})$$
$$+\alpha_2 f^2(ROI_{DistalWall}) - \alpha_5 f^5(ROI_{DistalMiddleLayer})$$
$$-\alpha_3 f^3(ROI_{Trough})$$

One particular example of a filter comprising five regions of interest is:

$$F = +\text{Max}(R_{ProximalWall}) - \text{mean}(R_{ProximalMiddleLayer})$$
$$+\text{Max}(R_{DistalWall}) - \text{mean}(R_{DistalMiddleLayer})$$
$$-\text{mean}(R_{Trough})$$

Max is the maximum value of the signal in the region of interest and mean ( ) is the mean of the signal in the region of interest.

Another exemplary embodiment consists in normalizing the initial filter by the mean of the central or trough region of interest.

$$F' = \frac{F}{\text{mean}(ROI_{Trough})}$$

In another variant embodiment, if similar anatomical objects are present, it is possible to augment the filter in order to consider extrinsic properties of the target object, for example if the radial artery has a vein on each side, the following form makes it possible to distinguish it:

$$F'' = F - \alpha_6 f^6(ROI_{LeftVein}) - \alpha_7 f^7(ROI_{RightVein})$$

In this embodiment, the filter is made up of seven regions.

Generally, the filter is defined on at least three consecutive time intervals by three respective functions each weighted by a factor, wherein the factors associated with the first time interval and the third time interval are of the same sign and the factor associated with the second time interval is of opposite sign.

When the filter is defined on five time intervals, it is then defined on at least an additional first time interval situated before the first time interval and an additional second time interval situated after the third time interval, wherein the factors associated with the two additional time intervals are of the same sign as the factor associated with the second time interval.

In other words, the factors of the filter that correspond to two consecutive intervals are of opposite signs.

Generally, alternating the signs of the factors of the filter on two consecutive intervals makes it possible to obtain a filtered signal that has an extremum when the filter coincides in time with the centre of the interval delimited by two amplitude peaks of the initial signal, wherein these peaks correspond to the echoes of the signal on the walls of the blood vessel.

The filter can be implemented in cascade, iteratively, for example by applying the filter to the entire signal during a first iteration, then applying another filter to the result of the first filtering, centred on a reduced time zone, during the subsequent iterations.

The filtering step 202 is applied to all of the ultrasonic signals acquired corresponding to all of the column vectors of the ultrasonic image in FIG. 3a.

Alternatively or additionally, it is also possible to apply the same processing to each row vector of the ultrasonic image in order to identify the centre of the artery along the dimension parallel to the axis of the linear probe.

Figure 3B:
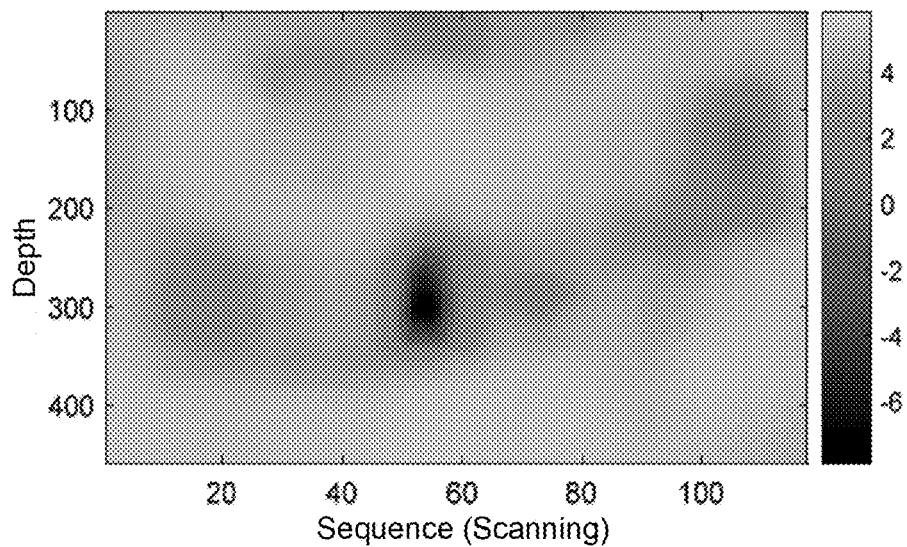
FIG. 3b shows the image in FIG. 3a filtered using a first filter defined according to the invention.

FIG. 3b shows the result of applying the filter in FIG. 4b to all of the signals (equivalent to FIG. 4c for one signal).

Figure 3C:
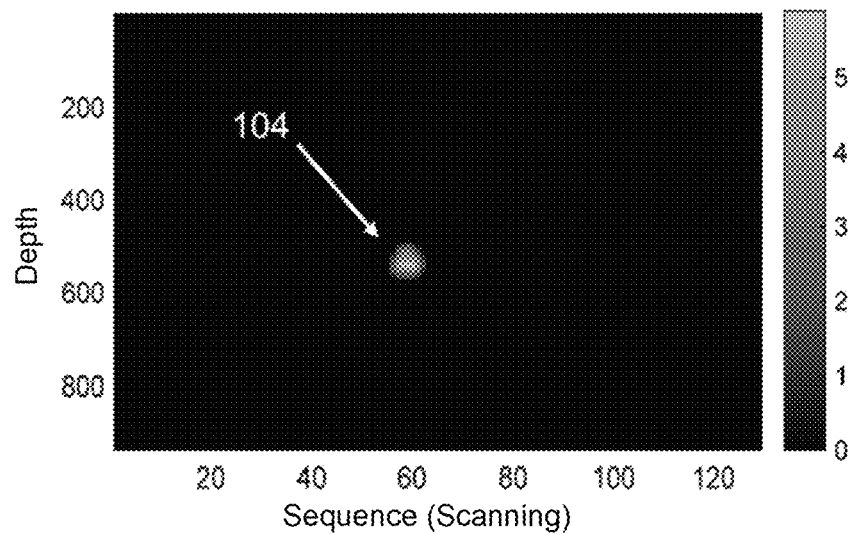
FIG. 3c shows the image in FIG. 3b filtered using a second filter defined according to the invention, so as to allow the detection of the radial artery.

FIG. 3c shows the final result after the positive values have been zeroed. The artery 104 can be identified accurately in the image in FIG. 3c.

The result of each filtering can be stored in a memory and refreshed incrementally, keeping the optimum each time. It is also possible to partially store the optimal result of each signal, or to fully store all of the filtering results, depending on the resources available, and then in step 203 of the method, the signal of all of the filtered signals that comprises the highest amplitude extremum (as an absolute value) is then found. The corresponding signal selected is the signal that corresponds to the path that passes through the centre of the artery. This signal must have the largest trough region (between the two walls of the artery) and therefore generate the greatest negative contribution of all of the signals. This is also reinforced by the wall, which often has a maximum amplitude at the centre.

Finally, in step 204, the centre of the blood vessel is determined by plotting the abscissa of the extremum measured on the selected signal.

This time abscissa t is then converted into a distance d on the basis of the velocity v of the ultrasonic signal in the medium:

$$D = \frac{1}{2} V \cdot t$$

A second embodiment of the invention will now be described, consisting in then determining the diameter of the blood vessel the centre of which has been detected.

Figure 5:
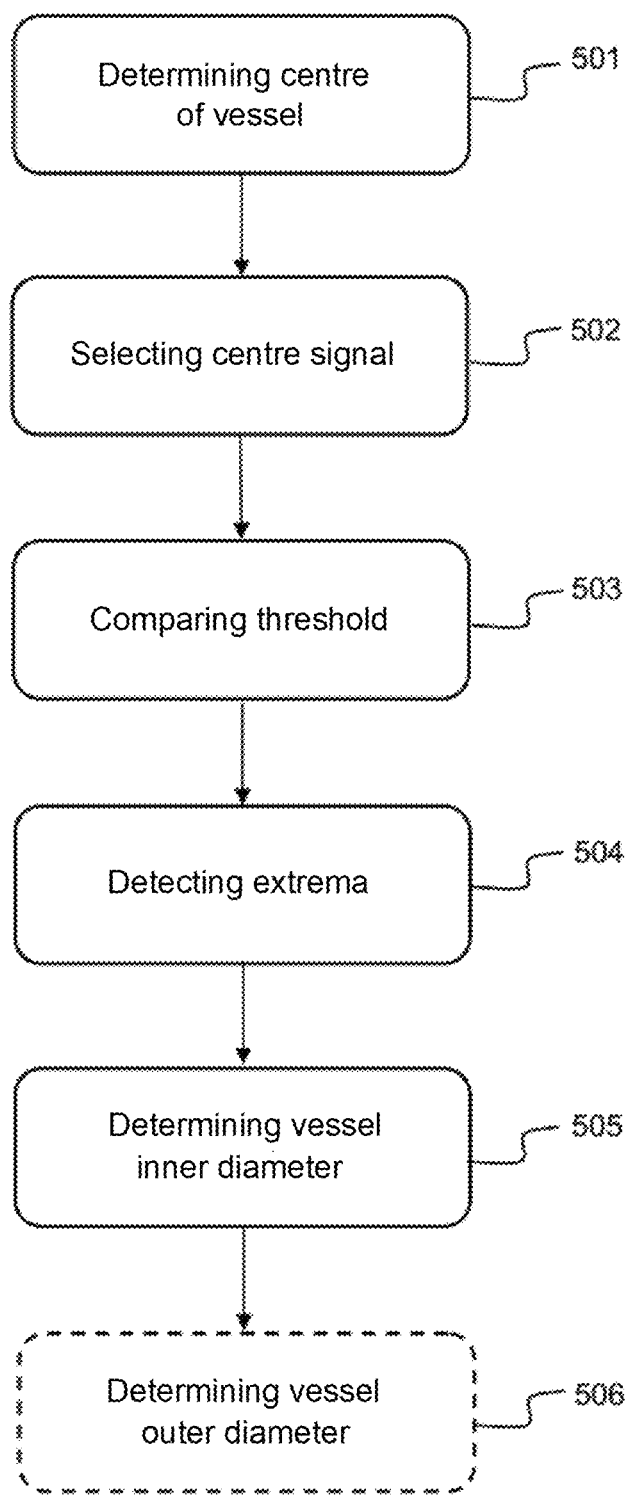
FIG. 5 shows a flow chart describing the steps of implementing a method for determining the diameter of a blood vessel according to one embodiment of the invention.

This second embodiment is described in FIG. 5.

It starts in step 501 by determining the centre of the vessel by means of the method described above with reference to FIG. 2.

In step 502, the signal previously selected in step 203, which corresponds to the ultrasonic path that passes through the centre of the vessel, is selected.

Figure 6:
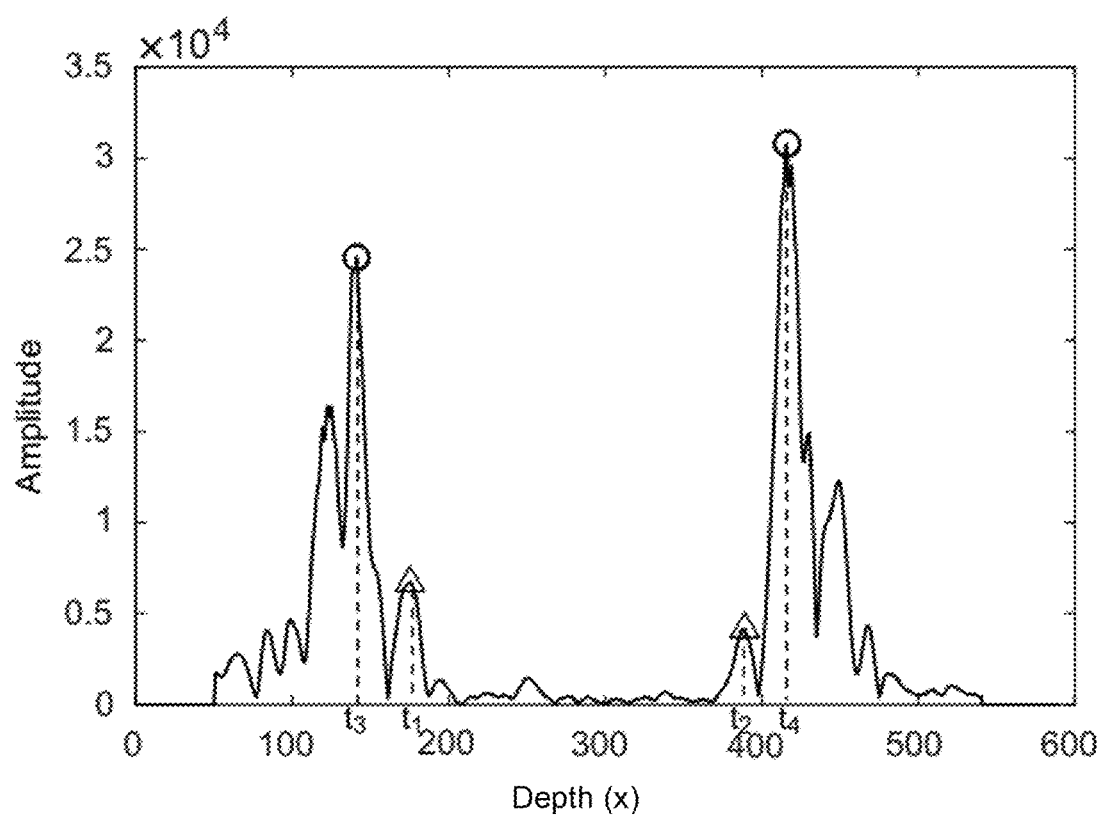
FIG. 6 shows an example of an ultrasonic signal used to determine the diameter of a blood vessel according to the method in FIG. 5.

FIG. 6 shows an example of such a signal on which a plurality of extremum peaks have been identified.

In step 503, a threshold is applied to the signal in order to retain only the points corresponding to the regions of the extrema.

In step 504, the two points corresponding to the two extrema closest to the centre of the vessel determined in step 501 are detected.

In step 505, the inner diameter of the vessel is deduced therefrom. The two extrema detected correspond to the inner walls of the vessel. The inner diameter of the vessel is then equal to $$= \frac{1}{2} V \cdot (t_2 - t_1),$$

where $t_2$, $t_1$ are the abscissas of the two extrema identified in FIG. 6.

In an optional step 506, the outer diameter of the vessel is also determined using the same relation $$D = \frac{1}{2} V \cdot (t_4 - t_3),$$

where $t_3$, $t_4$ are the abscissas of two other extrema that exceed the threshold of step 503 and are situated immediately after a low-intensity region that has low echogenicity and is intermediate between the inner wall and the outer wall of each of the proximal and distal sides. In other words, the extrema detected in step 506 are extrema situated immediately on either side of the first extrema detected in step 505 as shown in FIG. 6.

The different abscissas of the four extrema considered are identified in FIG. 6.

As explained above, the method in FIG. 5 can also be applied to the horizontal dimension of the ultrasonic image, in order to determine the diameter of the vessel along this dimension.

Although the invention has been described preferably for medical applications consisting in characterizing a blood vessel, and more specifically a radial artery, it can apply more generally to any application involving ultrasonic images of tubular objects.

REFERENCES

[1] J. H. Gagan et al., "Automated Segmentation of Common Carotid Artery in Ultrasound Images", in IEEE Access, vol. 10, pp. 58419-58430, 2022

[2] "A feasibility study of a PMUT-based wearable sensor for the automatic monitoring of carotid artery parameters", 2021 IEEE International Ultrasonics Symposium (IUS)

The invention claimed is:

1. A method for characterizing a tubular object by ultrasonic imaging, the method comprising the steps of:
    acquiring, by means of an ultrasonic transducer, a plurality of ultrasonic signals originating from the reflection of an ultrasonic field transmitted by the transducer in a region of interest in a transverse cross-sectional plane of the object, for different positions of the transducer relative to said region,
    forming an ultrasonic image of the region from the ultrasonic signals,
    selecting a dimension of the ultrasonic image and, for each signal corresponding to a vector of the image along the dimension selected, applying a predetermined first filter to the signal, the filter being configured so as to convert a first signal comprising two extrema having the same sign into a second signal comprising one extremum having an opposite sign to the sign of the two extrema of said first signal, the extremum having a position in the second signal that is situated between the respective positions of the two extrema of the first signal in the first signal,
    selecting, from all of the signals, the signal for which the result of the filter contains the extremum with the highest absolute value, and plotting the abscissa of this extremum,
    determining the center of the object from the abscissa plotted and the velocity of the ultrasonic signal.

2. The method for characterizing a tubular object according to claim 1, wherein the filter is applied to the envelope of the ultrasonic signal or to the absolute value of the ultrasonic signal.

3. The method for characterizing a tubular object according to claim 2, wherein the filter is applied to the signal in a sliding window of predefined size as a function of one of the size of the signal or prior information about the dimension of the object, the filter being set on at least three consecutive time intervals by three respective functions each weighted by a factor, the factors associated with two consecutive time intervals being of opposite signs.

4. The method for characterizing a tubular object according to claim 3, wherein the dimension of the second time interval is selected so that it is less than a time duration corresponding to the minimum diameter of the object to be characterized on the basis of the velocity of the ultrasonic signal.

5. The method for characterizing a tubular object according to claim 3, wherein the filter is set on at least two additional time intervals.

6. The method for characterizing a tubular object according to claim 3, wherein each of the functions is taken from: a sum, a maximum value, a mean, or a combination of these functions.

7. The method for characterizing a tubular object according to claim 1, further comprising the steps of:
    selecting the ultrasonic signal acquired for which the center of the object has been determined,
    applying a predetermined threshold to said ultrasonic signal selected,
    detecting at least two extrema of said signal that are greater than the threshold,
    selecting the pair of extrema, comprising a first extremum and a second extremum, closest to the center of the object and situated on either side of the center of the object, plotting their respective time abscissas and deducing therefrom the inner diameter of the object on the basis of the difference between the two abscissas and the velocity of the ultrasonic signal.

8. The method for characterizing a tubular object according to claim 7, comprising the steps of:
   selecting a third extremum greater than the threshold and situated immediately before the first extremum,
   selecting a fourth extremum greater than the threshold and situated immediately after the second extremum,
   plotting the time abscissas of the third extremum and the fourth extremum and deducing therefrom the outer diameter of the object on the basis of the difference between the two abscissas and the velocity of the ultrasonic signal.

9. The method for characterizing a tubular object according to claim 1, wherein the object is a blood vessel.

10. The method for characterizing a blood vessel according to claim 9, wherein the step of acquiring a plurality of ultrasonic signals comprises the sub-steps of:
    positioning a transducer comprising a plurality of aligned elements on an area of the skin so as to image a transverse cross-section of the blood vessel,
    performing a plurality of successive ultrasonic acquisitions from different transmission points situated on the axis of alignment of the elements, each ultrasonic transmission being performed in a direction substantially perpendicular to the axis of alignment.

11. An ultrasonic imaging device comprising an ultrasonic transducer and a processing unit configured to perform the steps of the method according to claim 1.

* * * * *